US012058574B2

(12) United States Patent
Ohseki et al.

(10) Patent No.: US 12,058,574 B2
(45) Date of Patent: Aug. 6, 2024

(54) TERMINAL DEVICE THAT PERFORMS COMMUNICATION IN STAND-BY STATE, METHOD FOR CONTROLLING THE SAME, AND COMPUTER-READABLE STORAGE MEDIUM

(71) Applicant: KDDI CORPORATION, Tokyo (JP)

(72) Inventors: Takeo Ohseki, Fujimino (JP); Masahito Umehara, Fujimino (JP); Issei Kanno, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 608 days.

(21) Appl. No.: 17/198,620

(22) Filed: Mar. 11, 2021

(65) Prior Publication Data

US 2021/0204184 A1 Jul. 1, 2021

Related U.S. Application Data

(63) Continuation of application No. PCT/JP2019/030157, filed on Aug. 1, 2019.

(30) Foreign Application Priority Data

Sep. 20, 2018 (JP) ................................. 2018-175780

(51) Int. Cl.
*H04W 36/08* (2009.01)
*H04W 36/00* (2009.01)

(52) U.S. Cl.
CPC ....... *H04W 36/08* (2013.01); *H04W 36/0055* (2013.01)

(58) Field of Classification Search
CPC . H04W 36/08; H04W 36/0055; H04W 76/27; H04W 28/08; H04W 28/16; H04W 48/08; H04W 72/20
See application file for complete search history.

(56) References Cited

U.S. PATENT DOCUMENTS

2017/0311317 A1* 10/2017 Dinan .................... H04W 72/52
2018/0124756 A1* 5/2018 Ko ........................ H04L 5/0053
(Continued)

FOREIGN PATENT DOCUMENTS

EP 3 677 089 A1 7/2020
EP 3 782 399 A1 2/2021
(Continued)

OTHER PUBLICATIONS

NPL Document, "Discussion on cell selection in case of state transition from Connected to Inactive", Aug. 10, 2018 (Year: 2018).*

(Continued)

*Primary Examiner* — Mewale A Ambaye
(74) *Attorney, Agent, or Firm* — Foley & Lardner LLP

(57) ABSTRACT

A terminal comprises a function capable of operating in a plurality of states that include a first state in which a connection with a base station has been established, and a second state in which a connection with a base station has not been established, but the base station holds information regarding the terminal device. After starting operation in the second state from a state in which the terminal operates with a first base station in the first state, if predetermined information that enables communication with the first base station in the second state and that has been acquired from the first base station in the first state is held, the terminal determines whether a signal transmission target has changed from the first base station to a second base station device, and performs communication according to a result of the determination.

12 Claims, 6 Drawing Sheets

(56) References Cited

U.S. PATENT DOCUMENTS

| | | | |
|---|---|---|---|
| 2019/0037565 A1* | 1/2019 | Zheng | H04W 72/04 |
| 2020/0045591 A1* | 2/2020 | Yokoyama | H04W 76/27 |
| 2020/0092779 A1 | 3/2020 | Jung et al. | |
| 2020/0146069 A1* | 5/2020 | Chen | H04W 52/362 |
| 2020/0229057 A1* | 7/2020 | Park | H04W 36/30 |
| 2020/0314700 A1 | 10/2020 | Da Silva et al. | |
| 2021/0127449 A1 | 4/2021 | Da Silva et al. | |
| 2021/0211945 A1 | 7/2021 | Rugeland et al. | |

FOREIGN PATENT DOCUMENTS

| | | | |
|---|---|---|---|
| EP | 3 791 681 A1 | 3/2021 | |
| EP | 3 858 088 A1 | 8/2021 | |
| EP | 3 881 643 A1 | 9/2021 | |
| WO | WO-2017/167198 A1 | 10/2017 | |
| WO | WO-2018/128018 A1 | 7/2018 | |
| WO | WO-2018128018 A1 * | 7/2018 | H01R 25/162 |
| WO | WO-2018/138854 A1 | 8/2018 | |
| WO | WO-2018138854 A1 * | 8/2018 | |
| WO | WO-2020/102685 A1 | 5/2020 | |

OTHER PUBLICATIONS

Extended European Search Report issued in corresponding European Patent Application No. 19863729.0 dated Oct. 11, 2021.

"3rd Generation Partnership Project; Technical Specification Group Radio Access Network; NR; NR and NG-RAN Overall Description; Stage 2 (Release 15)", 3GPP TS 38.300, V15.2.0, Jun. 2018, 87 pages.

ZTE, "Study on Non-orthogonal Multiple Access for NR", 3GPP™ Work Item Description, 3GPP TSG RAN Meeting #76 RP-171043, Jun. 5-8, 2017, 5 pages.

Huawei, HiSilicon, "Discussion on cell selection in case of state transition from Connected to Inactive" [online], 3GPP TSG RAN WG2 Meeting #103 R2-1812432, Aug. 10, 2018, sections 2, 5, 3 pages.

ZTE, "Procedures related to NOMA" [online], 3GPP TSG RAN WG1 #94 R1-1808153, Aug. 11, 2018, entire text, 9 pages.

Rapporteur (Nokia), "NR Corrections (38.300 Baseline CR covering RAN3-101 agreements)" [online], 3GPP TSG-RAN WG2 Meeting #103 R2-1813140, Sep. 4, 2018, entire text, 12 pages.

Kddi, "Discussion on procedures related to NOMA" [online], 3GPP TSG RAN WG1 Meeting #94bis R1-1811486, Sep. 28, 2018, entire text, 6 pages.

Ericsson, Clause 8.2.2.1 (key handling—RRC Inactive/Connected state transition), 3GPP TSG SA WG3 #89 S3-173094,3GPP, 2017 (7 pages).

Ericsson, Inactive to Connected state transitions, 3GPP TSG RAN WG2 #97 R2-1700885, 3GPP, 2017 (5 pages).

Huawei, RAN paging enhancement, 3GPP TSG RAN WG3 #97bis R3-173704, 3GPP, 2017 (6 pages).

Office Action issued in corresponding Japanese Patent Application No. 2021-178053, dated Sep. 9, 2022, with English translation (9 pages).

ZTE Corporation, Sanechips, Security of Reject message, 3GPP TSG RAN WG2 #101bis R2-1804460, 3GPP, 2018 (5 pages).

CATT, "Small data transmission in inactive state", 3GPP TSG-RAN WG2 Meeting #95bis R2-166118, Oct. 10, 2016-Oct. 14, 2016, Kaohsiung, Taiwan (4 pages).

Huawei et al., "Inter-RAT mobility for inactive UE", 3GPP TSG-RAN WG2 Meeting #100 R2-1712573, Nov. 27, 2017-Dec. 1, 2017, Reno, US (5 pages).

Intel Corporation, "Grant-free UL transmissions in NR", 3GPP TSG-RAN WG1 #86bis R1-1609499, Oct. 10, 2016-Oct. 14, 2016, Lisbon, Portugal (8 pages).

Office Action issued in corresponding Japanese Patent Application No. 2022-201490 dated Oct. 2, 2023 (5 pages).

* cited by examiner

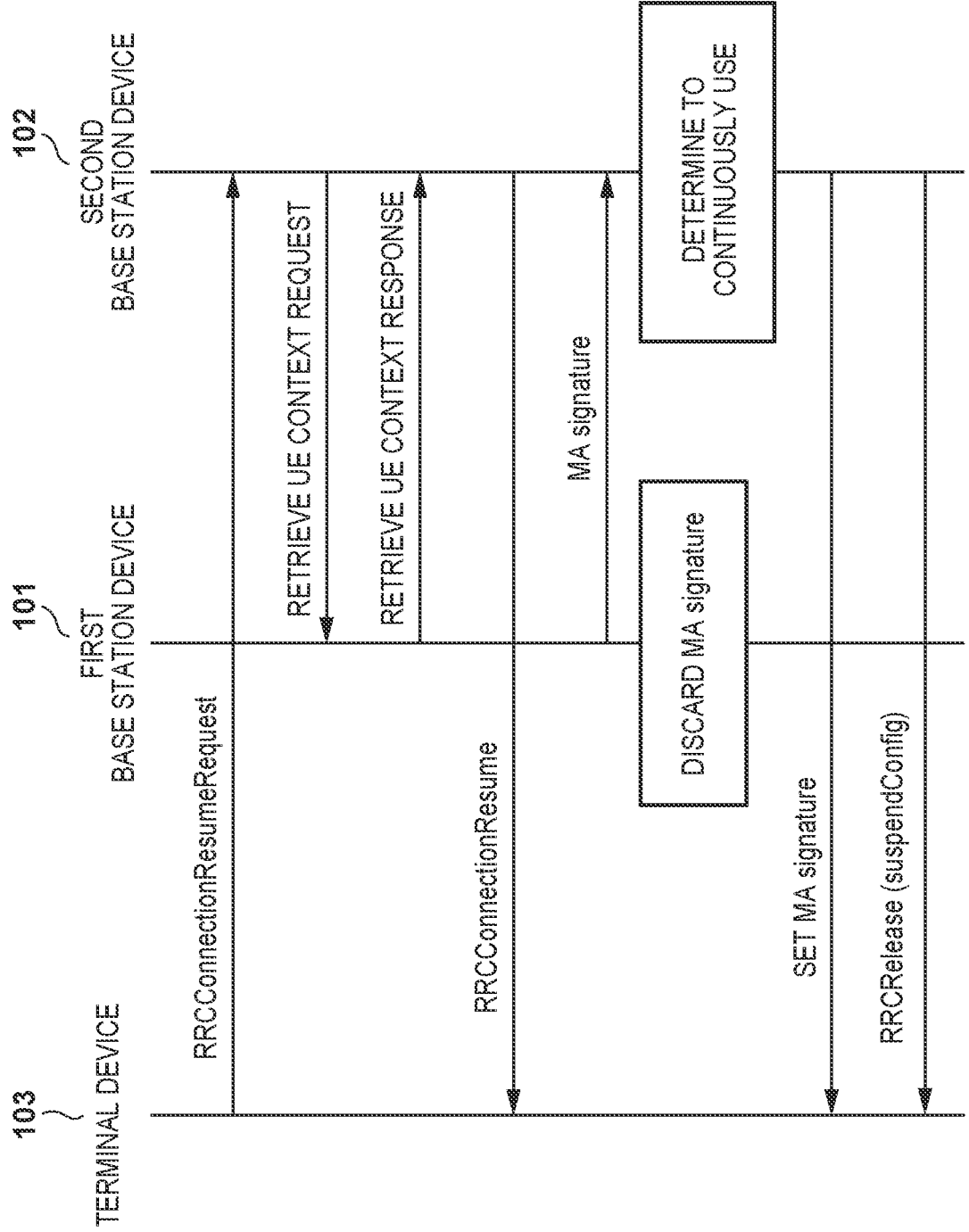

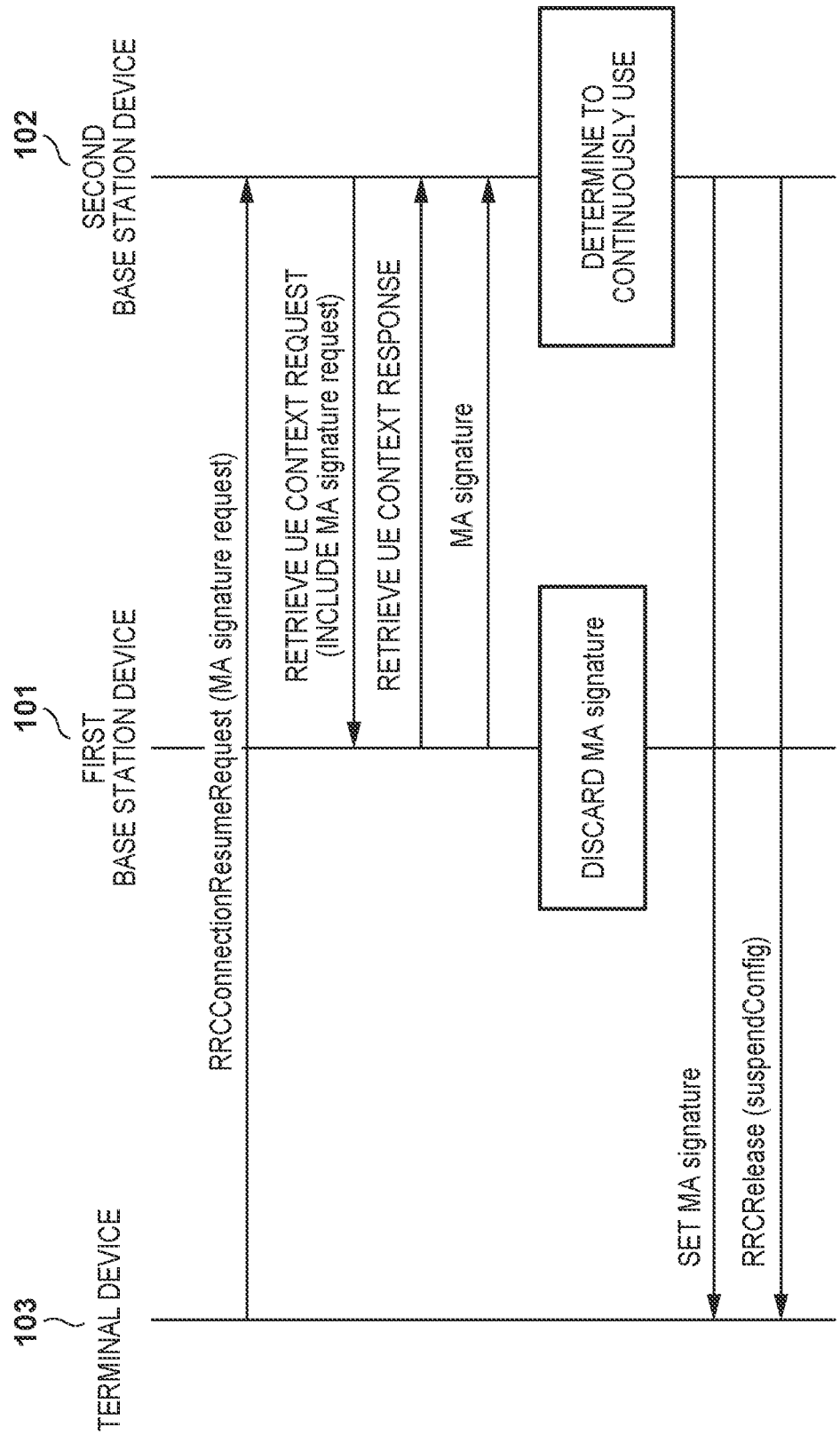

TERMINAL DEVICE THAT PERFORMS COMMUNICATION IN STAND-BY STATE, METHOD FOR CONTROLLING THE SAME, AND COMPUTER-READABLE STORAGE MEDIUM

CROSS-REFERENCE TO RELATED APPLICATION(S)

This application is a continuation of International Patent Application No. PCT/JP2019/030157 filed on Aug. 1, 2019, which claims priority to and the benefit of Japanese Patent Application No. 2018-175780 filed on Sep. 20, 2018, the entire disclosures of which are incorporated herein by reference.

BACKGROUND OF THE INVENTION

Field of the Invention

The present invention relates to a terminal device, a method for controlling the same, and a computer-readable storage medium, and specifically relates to a control technique used by a terminal device in a stand-by state to transmit a signal.

Description of the Related Art

In 3GPP, NR (New Radio) has been standardized as the $5^{th}$ generation wireless communication method (see NPL 1). A terminal device conforming to NR can transition to an RRC_INACTIVE state in addition to two states that a terminal device conforming to LTE (Long Term Evolution) can take, namely an RRC_CONNECTED state and an RRC_IDLE state. Here, RRC_CONNECTED is a state in which the terminal device is connected to a base station device and is performing communication, and RRC_INACTIVE and RRC_IDLE are stand-by states. Note that the RRC_INACTIVE state is a state in which context information (regarding a terminal device) that is to be used by the terminal device to communicate with a core network is held by a base station device (a last connected base station) to which the terminal device has been connected until the state transitions to the RRC_INACTIVE state, and the RRC_IDLE state is a state in which such information is not held by the base station device.

NPL 2 discloses that studies have been carried out to enable a terminal device in the RRC_INACTIVE state to transmit data, and that an MA (Multiple Access) signature is assigned to the terminal device to realize such data transmission. An MA signature may be, for example, a time/frequency radio resource block, a modulation coding method (MCS), a demodulation reference signal (DMRS) that is used to identify a terminal device, or information that identifies a data transmission pattern that is unique to a terminal device such as an interleave pattern. A terminal device transmits data by using an MA signature, and a base station device can separate and identify the data transmitted from the terminal device, by using the MA signature.

CITATION LIST

Non-Patent Literature

NPL1: 3GPP TS 38.300, V15.2.0, June 2018
NPL2: 3GPP written contribution, RP-171043

A terminal device in the RRC_INACTIVE state can move in an RNA (RAN-based Notification Area) without notifying the network. Therefore, it can be conceived that the terminal device moves to, although within the RNA, an area expanded by a base station device that is different from the last connected base station. In such a case, the base station device at the destination does not hold the MA signature for the terminal device, and may be unable to extract data transmitted from the terminal device in the RRC_INACTIVE state. On the other hand, the terminal device can reliably transmit data by transitioning to the RRC_CONNECTED state each time the terminal device transmits data. However, it is necessary to perform processing to transition to the RRC_CONNECTED state each time, and therefore efficiency may degrade.

SUMMARY OF THE INVENTION

The present invention enables a terminal device to perform efficient communication in a stand-by state.

A terminal device according to one aspect of the present invention includes: a communication circuit capable of operating in a plurality of states that include a first state in which a connection with a base station device has been established, and a second state in which a connection with a base station device has not been established, but the base station device holds information regarding the terminal device; and a controller configured to, after the communication circuit that has been operating with a first base station device in the first state starts operating in the second state, if predetermined information that enables the communication circuit to perform communication with the first base station device in the second state and that has been acquired from the first base station device in the first state is held, determine whether or not a target to which a signal is to be transmitted has changed from the first base station device to the second base station device, and control the communication circuit so that the communication circuit performs communication according to a result of the determination.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7 is a diagram showing an example of the flow of processing performed by the wireless communication system.
FIG. 8 is a diagram showing an example of a flow of processing performed by the wireless communication system.

DESCRIPTION OF THE EMBODIMENTS

The following describes an embodiment in detail with reference to the accompanying drawings. Note that the following embodiment does not limit the invention according to the scope of claims, and the invention does not necessarily require all of the combinations of features described in the embodiment. Two or more of the plurality of features described in the embodiment may be combined together in any manner. In addition, the same or similar components will be given the same reference numbers, and duplicate descriptions will be omitted.

Configuration of Wireless Communication System

Figure 1:
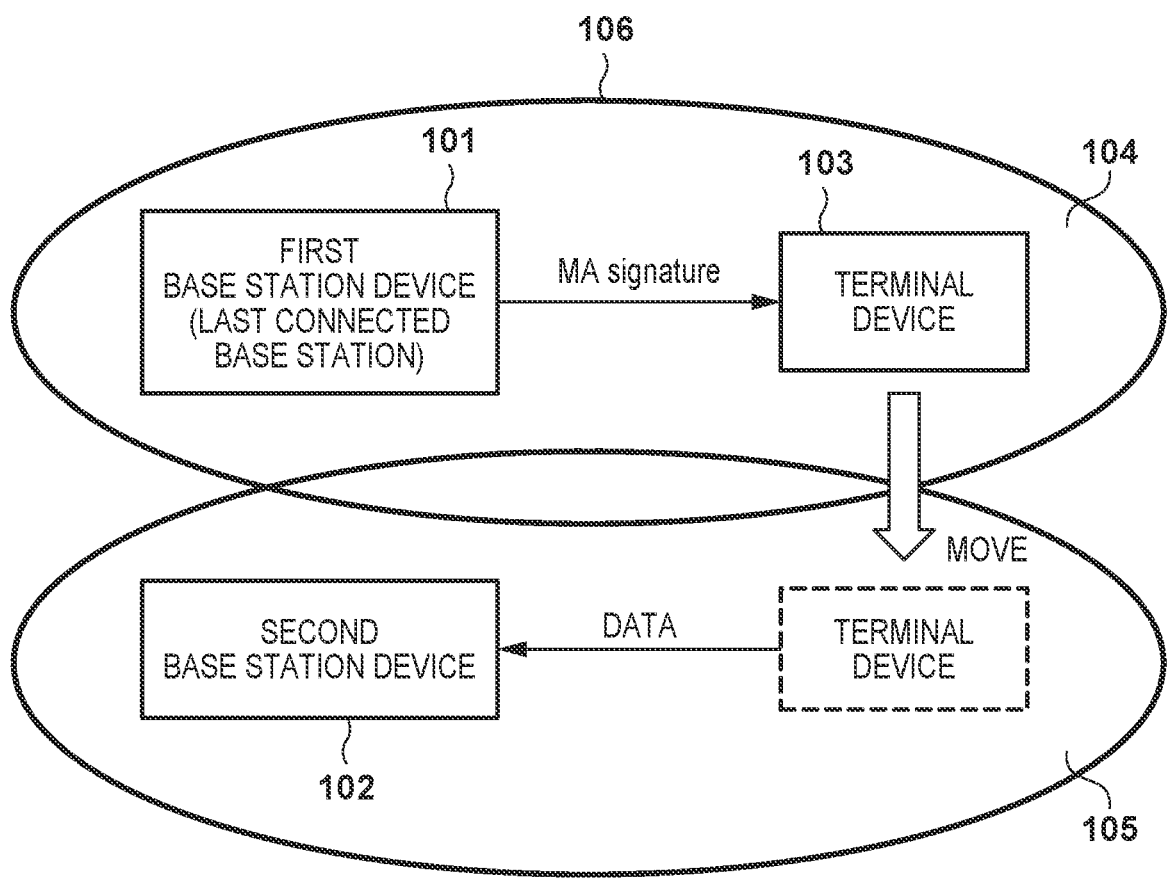
FIG. 1 is a diagram showing an example of a configuration of a wireless communication system.

FIG. 1 shows an example of a configuration of a wireless communication system according to the present embodiment. The wireless communication system includes, for example, a first base station device 101, a second base station device 102, and a terminal device 103. Although FIG. 1 shows two base station devices and one terminal device to simplify the descriptions thereof, a large number of base station devices and a large number of terminal devices may be present as in a common cellular communication system. Also, although the following describes a case in which NR, which is the $5^{th}$ generation wireless communication method, is employed, the present invention is not limited to such a case. For example, the following discussion can be applied to any other systems including a $5^{th}$ generation or later cellular communication system, and a terminal device (a communication device) that can communicate a certain amount of data in a standby state such as the RRC_INACTIVE state specified by NR. That is to say, the base station devices described below may be any base station devices that can perform communication not only with a terminal device with which a connection has been established, but also with a terminal device with which a connection has not been established, but that can perform certain amount of data communication. Also, the terminal device described below is configured to be able to operate in a first state in which a connection with a base station device has been established, and a second state in which a connection with a base station device has not been established, but the terminal device can perform a certain amount of data communication with the base station device.

The first base station device 101 and the second base station device 102 are, for example, base station devices that can operate in conformity with NR (gNB). The first base station device 101 and the second base station device 102 provide a communication service in a cell 104 and a cell 105, respectively. Note that the first base station device 101 and the second base station device 102 may form two or more cells/beams. The terminal device 103 is a terminal device that can operate in conformity with NR, and can communicate with a base station device that conforms to NR.

The terminal device 103 can acquire an MA signature from the first base station device 101, and use the MA signature in communication with the first base station device 101, for example. Note that the MA signature is predetermined information for realizing data communication in the RRC_INACTIVE state, and other information may be used instead of, or in addition to, the MA signature. Note that the MA signature may also be used in the RRC_CONNECTED state, for example. After receiving the MA signature, upon receiving an RRCRelease message with suspendConfig from the first base station device 101, for example, the terminal device 103 may transition to the RRC_INACTIVE state. Note that a base station device with which the terminal device 103 has been establishing a connection until the terminal device 103 transitions to the RRC_INACTIVE state, such as the first base station device 101, may be referred to as a last connected base station (last serving gNB).

NR defines an RNA that includes at least one cell, and a terminal device can move within the RNA (RAN-based Notification Area) in the RRC_INACTIVE state without notifying the network. In FIG. 1, for example, one RNA 106 that includes the cell 104 and the cell 105 formed by the first base station device 101 and the second base station device 102 has been set. Therefore, after transitioning to the RRC_INACTIVE state, the terminal device 103 can move to the cell 104 formed by the first base station device 101 to the cell 105 formed by the second base station device 102, without notifying the network.

Note that, when moving to the outside of the RNA, the terminal device 103 can establish a connection with the base station device at the destination, transition to the RRC_CONNECTED state, and transition to the RRC_INACTIVE state again in response to an RRCRelease message that includes "suspendConfig" from the base station device at the destination. In such a case, the terminal device 103 can receive an MA signature from the base station device at the destination, and therefore can transmit a data signal to the base station device in the RRC_INACTIVE state.

On the other hand, the terminal device 103 does not need to communicate with a base station device as long as it moves within the RNA. Therefore, when the terminal device 103 has moved from the cell 104 to the cell 105, it is possible that the second base station device 102 has not received a notification from the terminal device 103. In such a case, the second base station device 102 does not know the MA signature provided from the first base station device 101 to the terminal device 103, and the second base station device 102 has not provided an MA signature to the terminal device 103. Therefore, even if the terminal device 103 in the RRC_INACTIVE state transmits a data signal by using an MA signature provided from the first base station device 101, the second base station device 102 cannot separate the data signal from the received signal.

In contrast, the terminal device 103 can transition to the RRC_CONNECTED state each time it transmits data. As a result, the terminal device 103 can reliably transmit data even if it stays in a cell formed by a base station device that is different from the last connected base station. On the other hand, in order for the terminal device 103 in the RRC_INACTIVE state to transition to the RRC_CONNECTED state, the terminal device 103 needs to transmit an I-RNTI (Inactive Radio Network Temporary Identifier) for identifying a terminal device in the RRC_INACTIVE state, provided from the last connected base station, to a base station device to which the terminal device is to connect. That is to say, a certain signaling overhead occurs. At this time, the terminal device 103 transitions to the RRC_CONNECTED state even though the terminal device 103 has not moved from the cell formed by the first base station device 101, and performs signaling that is originally unnecessary. Thus, the communication efficiency of the wireless communication system may degrade.

Therefore, in the present embodiment, if the terminal device 103 holds an MA signature acquired from the last connected base station, the terminal device 103 monitors for whether or not the base station device to which a signal is to be transmitted has been changed from the last connected base station. That is to say, in the RRC_INACTIVE state, the terminal device 103 monitors a movement within the RNA on the condition that it holds an MA signature, in addition to monitoring regarding whether or not it has moved across an RNA. For example, when operating in the RRC_CONNECTED state, the terminal device 103 acquires an MA signature from the first base station device 101 to which the terminal device 103 is connected, and if the terminal device 103 thereafter transitions to the RRC_INACTIVE state, it monitors for whether or not it has moved from the cell 104 formed by the first base station device 101 to the cell 105 formed by the second base station device 102. As a result, the terminal device 103 can determine whether or not it can perform communication while staying in the RRC_INACTIVE state, using the MA signature held by the terminal device 103. Therefore, if the terminal device 103 holds an MA signature and the base station device to which a signal is to be transmitted has not changed from the last connected base station, the terminal device 103 transmits a data signal to the last connected base station by using the same MA signature while staying in the RRC_INACTIVE state.

On the other hand, even if the terminal device 103 holds an MA signature, if the base station device to which a signal is to be transmitted has changed from the last connected base station, the terminal device 103 cannot transmit a signal by using the MA signature. Therefore, when transmitting a signal, the terminal device 103 establishes a connection with the base station device to which the signal is to be transmitted, transitions to the RRC_CONNECTED state, and thereafter transmits a signal. As described above, when holding an MA signature, the terminal device 103 can avoid unnecessarily transitioning to the RRC_CONNECTED state by monitoring whether or not the base station device to which a signal is to be transmitted has changed from the last connected base station.

Note that the terminal device 103 can determine whether or not the base station device to which a signal is to be transmitted has changed from the last connected base station by acquiring an identifier of a cell (Physical Cell ID, PCI) from a synchronization signal (SS) or a notification signal (Physical Broadcast Channel, PBCH) transmitted from each base station device, and detecting whether or not there is a change in the PCI acquired from the received signal. However, the present invention is not limited to such a configuration, and the terminal device 103 may determine whether or not the base station device to which a signal is to be transmitted has changed from the last connected base station based on any information that the terminal device 103 can acquire in the RRC_INACTIVE state and that can distinguish between a plurality of base station devices.

If the terminal device 103 does not hold an MA signature, the terminal device 103 may refrain from such monitoring regarding whether or not the base station device to which a signal is to be transmitted has changed from the last connected base station. As a result, the terminal device 103 can avoid unnecessarily performing monitoring, and, for example, it is possible to reduce the power consumption of the terminal device 103. However, while the terminal device 103 is in the RRC_INACTIVE state, even in the case where the terminal device 103 does not monitor whether or not the base station device to which a signal is to be transmitted has changed from the last connected base station, the terminal device 103 regularly checks whether or not the terminal device 103 has moved across an RNA. If the terminal device 103 has moved across an RNA, the terminal device 103 establishes a connection with a base station device at the destination, transitions to the RRC_CONNECTED state, and updates an RNA. Note that the procedures for updating an RNA are known as a conventional technique, and therefore the details thereof will not be described.

Note that the terminal device 103 may invariably (regularly) perform such monitoring, or, when the terminal device 103 holds an MA signature, the terminal device 103 may determine whether or not the base station device to which a signal is to be transmitted has changed from the last connected base station, each time data to be transmitted is generated, for example. If the terminal device 103 invariably performs monitoring, the terminal device 103 can swiftly determine whether or not it is possible to transmit a signal when data to be transmitted is generated, while staying in the RRC_INACTIVE state. Therefore, it is possible to reduce the time from the generation of the data to the completion of the transmission of the signal. On the other hand, if the terminal device 103 determines whether or not the base station device to which a signal is to be transmitted has changed from the last connected base station after data to be transmitted is generated, it is unnecessary to perform monitoring processing from when it is determined that a signal is not to be transmitted. Therefore, it is possible to reduce the power consumption of the terminal device 103.

If it is determined that the base station device to which a signal is to be transmitted has changed from the last connected base station (for example, if the terminal device 103 has moved from the cell 104 formed by the first base station device 101 to the cell 105 formed by the second base station device), the terminal device 103 may discard the MA signature held by the terminal device 103. Also, if the terminal device 103 enters the RRC_CONNECTED state and transmits a signal to the base station device to which a signal is to be transmitted, the terminal device 103 may attempt to acquire an MA signature from the base station device. In the case where the terminal device 103 does not hold an MA signature, for example, the terminal device 103 may acquire an MA signature from the first base station device 101 if the terminal device 103 has transmitted a signal to the first base station device 101 in the RRC_CONNECTED state, and may acquire an MA signature from the second base station device 102 if the terminal device 103 has transmitted a signal to the second base station device 102 in the RRC_CONNECTED state. Even if the terminal device 103 holds an MA signature, the terminal device 103 may newly acquire an MA signature. In such a case, the terminal device 103 may overwrite the MA signature held thereby, or hold the MA signature held in the past as a history. Note that the terminal device 103 may acquire an MA signature while staying in the RRC_INACTIVE state. Generally, the terminal device 103 transmits an RRCConnectionResumeRequest message to the base station device to which a signal is to be transmitted, receives an RRCConnectionResume message from the base station device, and thus transitions to the RRC_CONNECTED state. Thereafter, the terminal device 103 may acquire an MA signature from the base station device that is in the connected state in such a case. On the other hand, for example, the terminal device 103 may transmit an RRCConnectionResumeRequest message in which an information element that requests for the issuance of an MA signature is included, and if the base station device receives the RRCConnectionResumeRequest message that includes the information element, the base station device may notify the terminal device 103 of the MA signature without making the terminal device 103 transition to the RRC_CONNECTED state. Note that this is an example, and the terminal device 103 may acquire an MA signature through other procedures. Note that the terminal device 103 performs processing corresponding to the message from the base station device, and may be unable to acquire an MA signature.

The base station device may acquire an MA signature held by the terminal device 103 from the last connected base station, for example, and continuously use the MA signature held by the terminal device 103, without change. In this case, for example, the base station device may transmit an RRCConnectionResume message that includes a bit indicating that the MA signature held by the terminal device 103 is to be continuously used, in response to the RRCConnectionResumeRequest message from the terminal device 103. For example, a bit indicating that the terminal device 103 is denied transition to the RRC_CONNECTED state may be included in the RRCConnectionResume message so as to indicate that the MA signature held by the terminal device 103 is to be continuously used. In the case where the base station device transmits an RRCConnectionResume message that includes a bit indicating that the terminal device 103 is to transition to the RRC_CONNECTED state, the base station device may subsequently transmit a separate message notifying the terminal device 103 of the MA signature. The base station device may use an information element separate from the bit indicating that the terminal device 103 is denied transition to the RRC_CONNECTED state, to notify the terminal device 103 that the MA signature held thereby is to be used continuously. In this case, the terminal device 103 can continuously use the MA signature held thereby, without transitioning to the RRC_CONNECTED state.

Device Configuration

Figure 2:
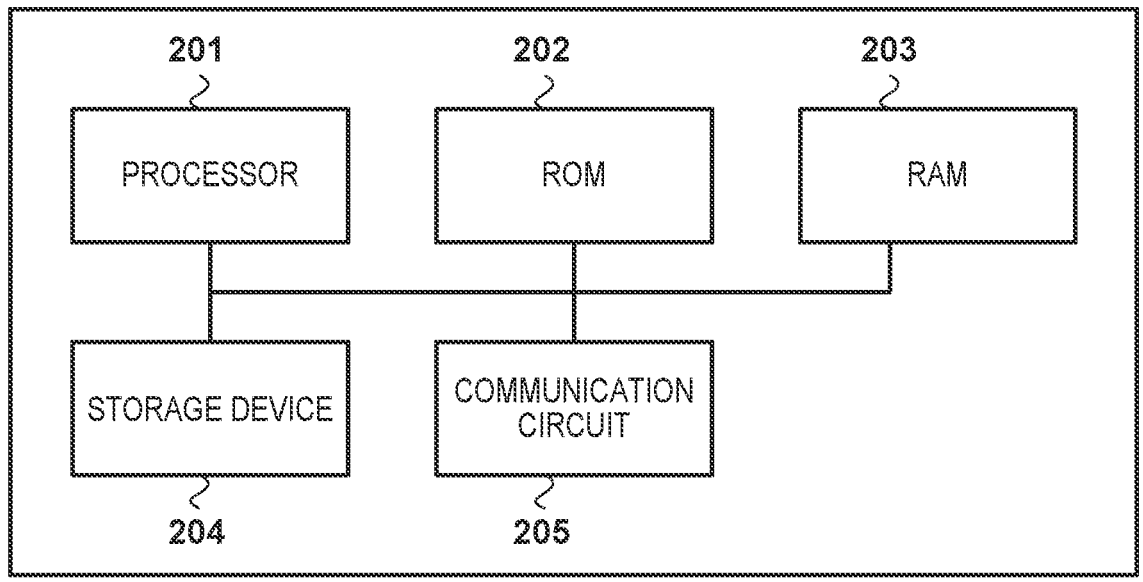
FIG. 2 is a diagram showing an example of a hardware configuration of a device.

Next, examples of hardware configurations of the base station devices (the first base station device 101 and the second base station device 102) and the terminal device 103 that perform the above-described processing will be described with reference to FIG. 2. In one example, these devices include a processor 201, a ROM 202, a RAM 203, a storage device 204, and a communication circuit 205. The processor 201 is a computer that includes at least one processing circuit such as a general-purpose CPU (Central Processing Unit) or an ASIC (Application Specific Integrated Circuit), and performs the overall processing for the devices and each kind of processing described above by reading out and executing a program stored in the ROM 202 or the storage device 204. The ROM 202 is a read-only memory that stores a program related to processing to be performed by the devices and information such as various parameters, for example. The RAM 203 functions as a work space when the processor 201 executes a program, and is a random access memory that stores temporary information. The storage device 204 is constituted by a removable external storage device or the like, for example. The communication circuit 205 is constituted by a circuit for wireless communication or wired communication, for example. The base station device includes, for example, a baseband circuit for NR, an RF circuit, etc., and an antenna as a communication circuit 205 for communication with the terminal device 103. The communication circuit 205 of the base station device may include a circuit for performing (wired or wireless) communication with another base station device or a network node, for example. Also, the terminal device 103 and the communication circuit 205 include a baseband circuit for NR, RF circuit, etc., and an antenna. The terminal device 103 may also include a communication circuit 205 for performing communication in conformity with wireless LAN or other communication standards. Although FIG. 2 shows one communication circuit 205, each device may have a plurality of communication circuits.

Figure 3:
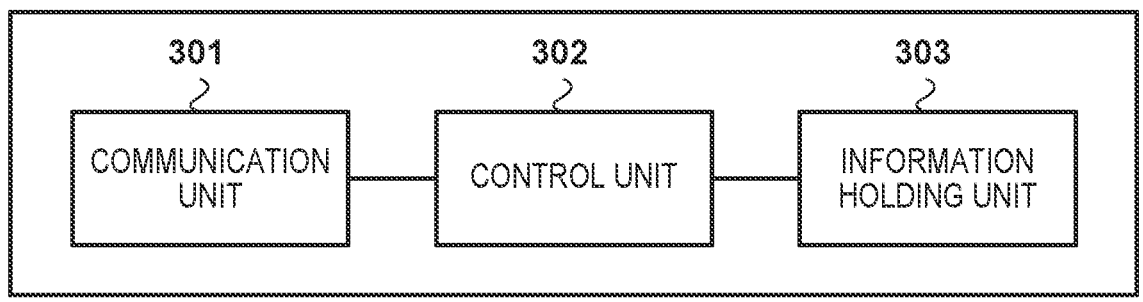
FIG. 3 is a diagram showing an example of a functional configuration of a terminal device.

FIG. 3 shows a schematic example of a functional configuration of the terminal device 103. In one example, the terminal device 103 includes a communication unit 301, a control unit 302, and an information holding unit 303. The communication unit 301 communicates with a base station device. Note that the communication unit 301 is configured to be able to operate in any of three states, namely the RRC_CONNECTED state, the RRC_INACTIVE state, and the RRC_IDLE state, under the control of the base station device, and transmit and receive data to and from the base station device to which the communication unit 301 is connected, in the RRC_CONNECTED state. Even in the RRC_INACTIVE state, the communication unit 301 can transmit a small amount of data to the base station device by using an MA signature held by the information holding unit 303 described below. The control unit 302 may perform various kinds of processing of the terminal device 103 as described above by controlling the communication unit 301. That is to say, the control unit 302 controls the communication unit 301 to perform processing such as determination regarding whether or not the base station device to which a signal is to be transmitted has changed from the last connected base station while the communication unit 301 has been operating in the RRC_INACTIVE state, on the condition that an MA signature is held by the information holding unit 303. The information holding unit 303 holds an MA signature that has been set by the base station device that is in the RRC_CONNECTED state. Note that the information holding unit 303 may hold the history of MA signatures set in the past. In such a case, the information holding unit 303 may discard the entire history information when a trigger is detected such as when the terminal device 103 moves across an RNA in the RRC_INACTIVE state.

Figure 4:
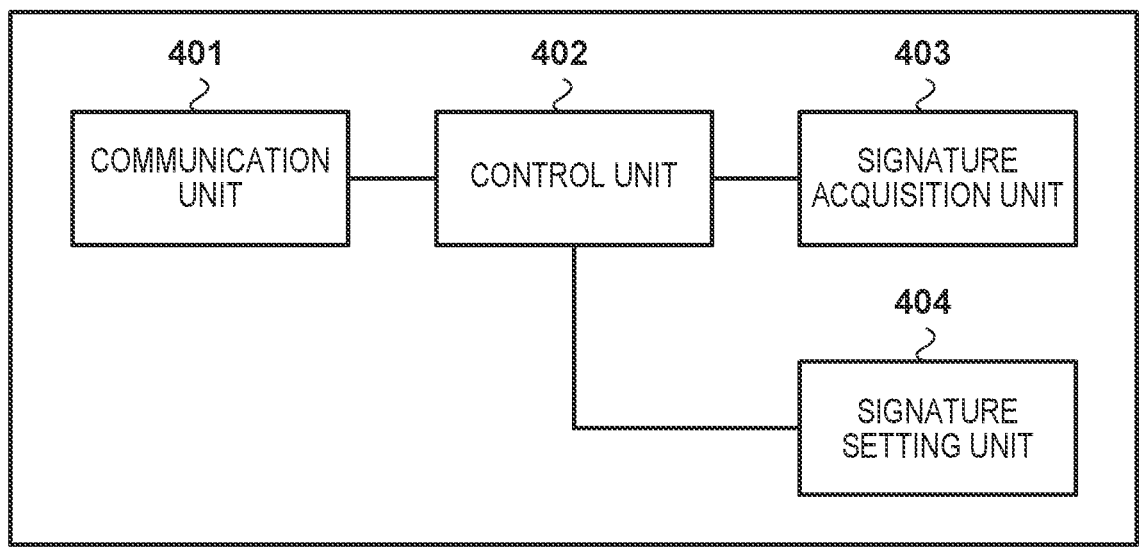
FIG. 4 is a diagram showing an example of a functional configuration of a base station device.

FIG. 4 shows a schematic example of a functional configuration of the base station devices (the first base station device 101 and the second base station device 102). In one example, each base station device includes a communication unit 401, a control unit 402, a signature acquisition unit 403, and a signature setting unit 404. The communication unit 401 communicates with the terminal device 103 and another base station device. Note that a communication unit for wireless communication with the terminal device 103 and communication unit for communication with another base station device may separately be provided. However, for example, when another base station device is operated according to the NR standards, only one communication unit 401 may be provided. The control unit 402 may perform various kinds of processing of the base station device as described above by controlling the communication unit 401. For example, the control unit 402 may acquire information regarding an MA signature from the last connected base station of the terminal device 103 by controlling the signature acquisition unit 403, and set the MA signature to the terminal device 103 by controlling the signature setting unit 404. For example, the control unit 402 determines whether or not to use the MA signature acquired by the signature acquisition unit 403 without change, and controls the signature setting unit 404 to use the acquired MA signature, use a new MA signature, or hold the MA signature. Furthermore, the control unit 402 may control the communication unit 401 so that the data signal transmitted from the terminal device 103 in the RRC_INACTIVE state is separated from the received signal by using the MA signature held by the signature setting unit 404. The signature acquisition unit 403 acquires the MA signature from the last connected base station of the terminal device 103. The signature setting unit 404 sets the MA signature to the terminal device 103 under the control of the control unit 402.

Processing Flow

Figure 5:
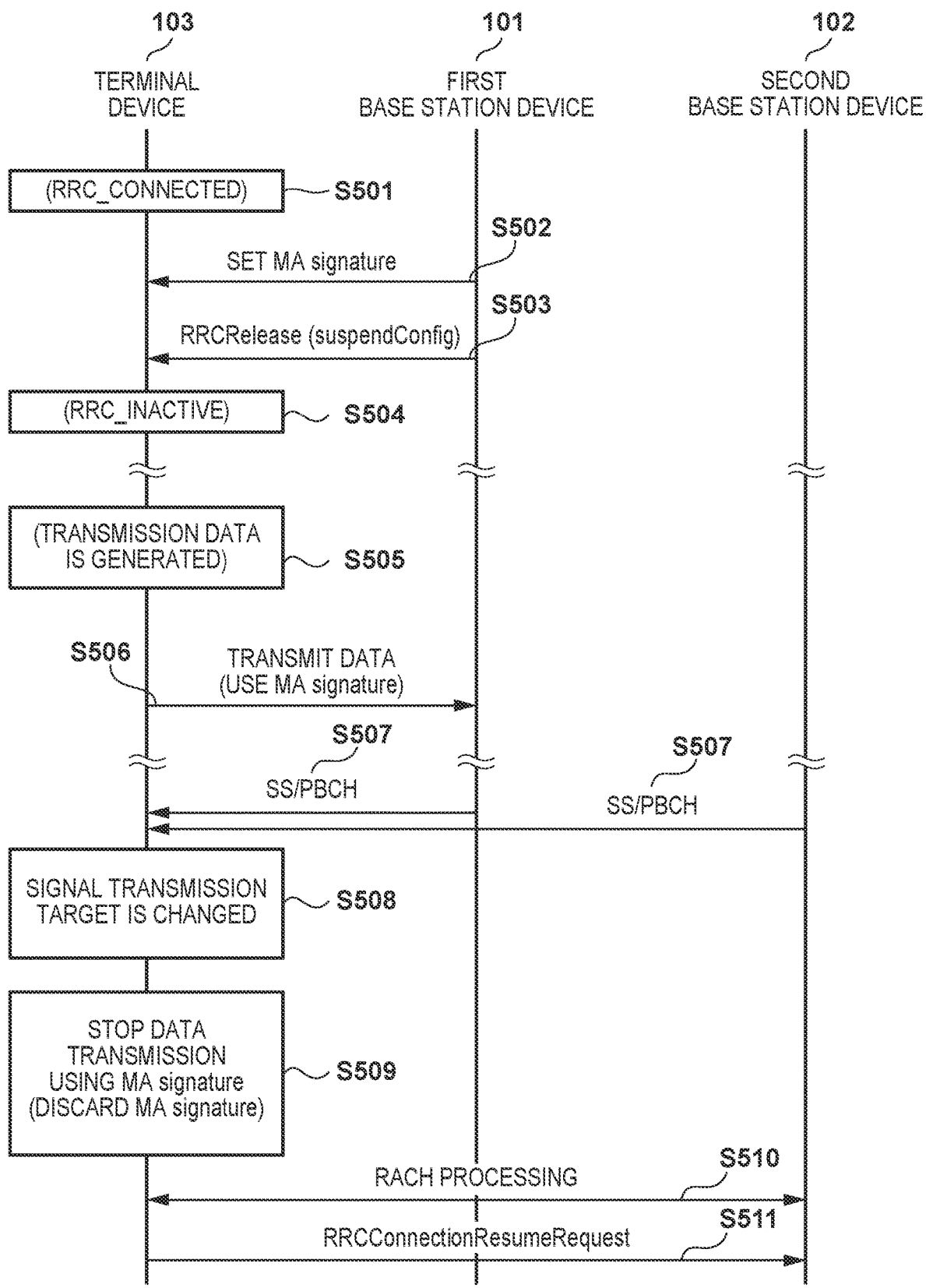
FIG. 5 is a diagram showing an example of the flow of processing performed by the wireless communication system.

FIG. 5 shows an example of the flow of processing performed by the wireless communication system according to the present embodiment. In FIG. 5, the terminal device 103 is communicating with the first base station device 101 in the RRC_CONNECTED state (S501). In this state, an MA signature is set to the terminal device 103 by the first base station device 101 to which the terminal device 103 is connected, and the terminal device 103 acquires the set MA signature (S502). Thereafter, upon receiving an RRCRelease message that includes "suspendConfig" (S503), the terminal device 103 transitions to the RRC_INACTIVE state (S504). In this way, the first base station device 101 that the terminal device 103 has been communicating with in the RRC_CONNECTED state immediately before transitioning to the RRC_INACTIVE state is the last connected base station for the terminal device 103.

If data to be transmitted is generated while the terminal device 103 is operating in the RRC_INACTIVE state (S505), the terminal device 103 transmits a signal that includes the data to the first base station device 101 by using the MA signature acquired in S502 while staying in the RRC_INACTIVE state (S506), and the first base station device 101 can separate and extract the data signal transmitted by the terminal device 103, from the received signal, using the MA signature set to the terminal device 103. Note that, when the terminal device 103 is operating in the RRC_INACTIVE state while holding the MA signature, the terminal device 103 determines whether or not the base station device to which a signal is to be transmitted on the assumption that the signal is to be transmitted at the time has been changed from the last connected base station (the first base station device 101), based on a synchronization signal (SS) or a notification signal (PBCH) received from a base station device around the terminal device 103 (S507). Note that, if the terminal device 103 in the RRC_INACTIVE state is not holding an MA signature, the terminal device 103 may only perform determination regarding movement across an RNA, without performing determination regarding movement including movement within an RNA as performed in S507. The period of cycles in which the determination regarding movement within an RNA is performed may be set to be shorter than the period of cycles in which determination regarding movement across an RNA is performed. That is to say, in the present embodiment, when the terminal device 103 is operating in the RRC_INACTIVE state while holding an MA signature, the terminal device 103 may more frequently perform determination regarding movement than when not holding an MA signature.

Upon determining that the base station device to which a signal is to be transmitted has changed from the last connected base station (S508), the terminal device 103 does not perform data transmission using the MA signature held thereby (S509). At this time, the terminal device 103 may discard the MA signature. However, the present invention is not limited to such a configuration, and the terminal device 103 may discard the MA signature only if the base station device to which a signal is to be transmitted has not returned to the last connected base station even when data to be transmitted is actually generated, and may keep holding the MA signature until then. In such a case, upon determining that the base station device to which a signal is to be transmitted has changed from the last connected base station, the terminal device 103 may transition to a mode in which data transmission using an MA signature is not permitted, instead of discarding the MA signature, and transition to a mode in which data transmission using an MA signature is permitted upon determining that the base station device to which a signal is to be transmitted has returned to the last connected base station.

For example, upon detecting that the base station device to which a signal is to be transmitted is different from the last connected base station or upon the generation of data to be transmitted, the terminal device 103 performs predetermined processing with the base station device to which a signal is to be transmitted (the second base station device 102) at the destination. For example, after performing RACH (Random Access Channel) processing with the second base station device, the terminal device 103 transmits an RRCConnectionResumeRequest message to establish a connection with the second base station device 102, and transitions to the RRC_CONNECTED state (S510, S511). An example of such predetermined processing will be described later.

Figure 6:
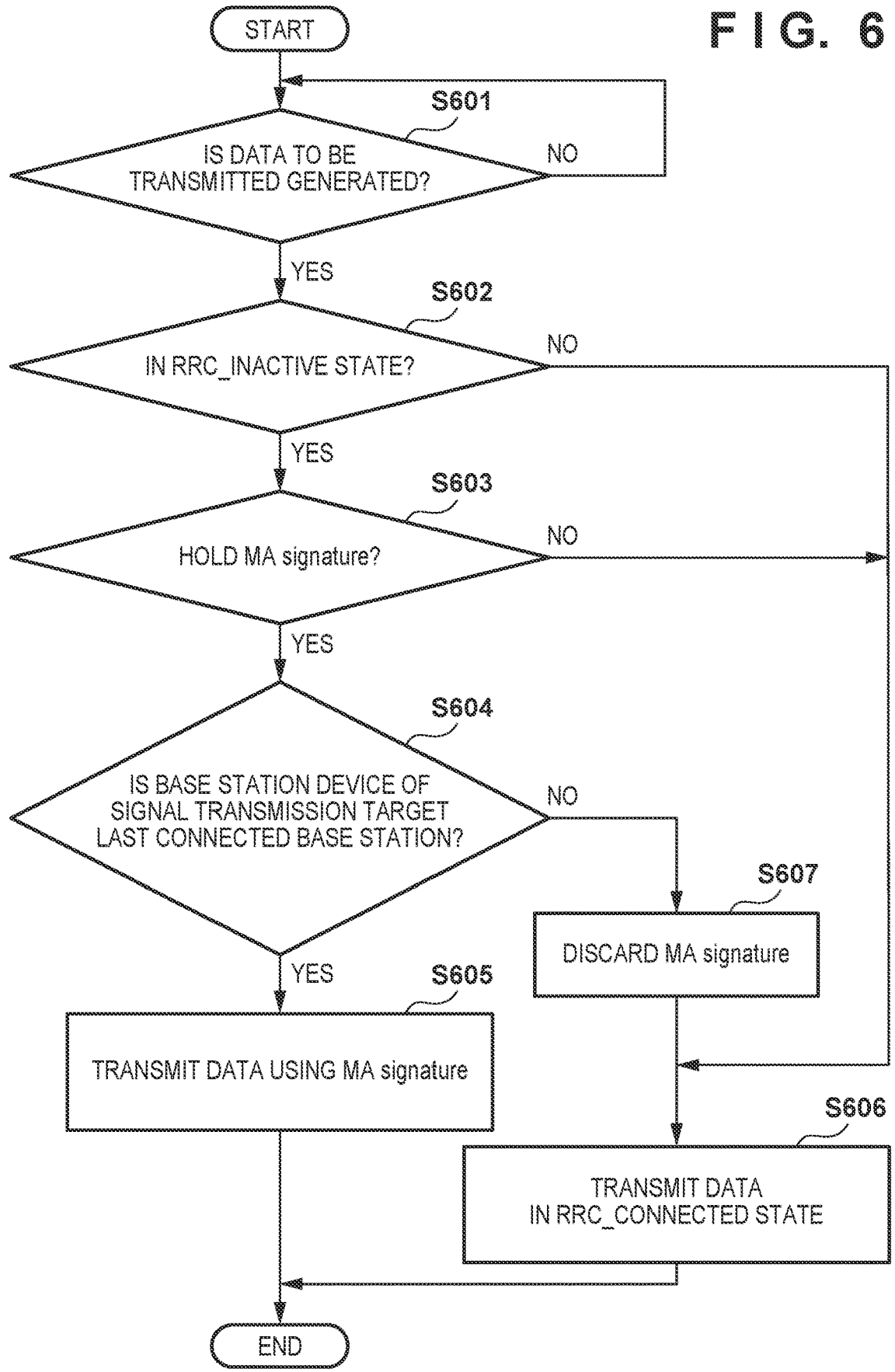
FIG. 6 is a diagram showing an example of the flow of processing performed by the terminal device.

In the above-described example, the terminal device 103 periodically monitors SS and PBCH to monitor whether or not the base station device to which a signal is to be transmitted has been changed from the last connected base station, and setting is performed regarding whether or not the transmission of a data signal using an MA signature is to be allowed. However, the present invention is not limited to such an example. For example, the terminal device 103 may determine whether or not to use the MA signature held thereby upon data to be transmitted being generated. FIG. 6 shows an example of the processing performed by the terminal device 103 in such a case. As shown in FIG. 6, upon data to be transmitted being generated (YES in S601), the terminal device 103 determines whether or not the terminal device 103 is in the RRC_INACTIVE state (S602), whether or not the terminal device 103 holds an MA signature (S603), and whether or not the base station device to which a signal is to be transmitted is the last connected base station (S604). Thereafter, if the terminal device 103 is operating in the RRC_INACTIVE state (YES in S602), the terminal device 103 holds an MA signature (YES in S603), and the base station device to which a signal is to be transmitted has not changed from the last connected base station (YES in S604), the terminal device 103 determines to transmit data while staying in the RRC_INACTIVE state, using the MA signature held thereby (S605). On the other hand, if the terminal device 103 is operating in the RRC_CONNECTED state (NO in S602), the terminal device 103 may transmit a data signal while maintaining the connection (S606). If the terminal device 103 is operating in the RRC_IDLE state, (NO in S602), or the terminal device 103 does not hold an MA signature despite the terminal device 103 operating in the RRC_INACTIVE state (NO in S603), or the base station device to which a signal is to be transmitted has changed from the last connected base station (NO in S604), the terminal device 103, for example, transmits an RRCConnectionSetupRequest message to the base station device to which a signal is to be transmitted to transition to the RRC_CONNECTED state, and thereafter transmits a data signal (S606). Note that if the terminal device 103 holds an MA signature, but the base station device to which a signal is to be transmitted has changed from the last connected base station (NO in S604), the terminal device 103 may discard the MA signature (S607).

As described above, by performing determination upon data to be transmitted being generated, it is possible to reduce the power consumption of the terminal device 103 compared to the case in which regular monitoring is performed. On the other hand, if regular monitoring is performed, the state at the time data to be transmitted is generated is the same as the state at the completion of the processing shown in FIG. 6. Therefore, a data signal can be swiftly transmitted. Therefore, different types of control may be performed for different terminal devices 103. For example, a terminal device 103 for which suppression of a delay is given priority over reduction of a power consumption may perform periodical monitoring, and a terminal device 103 for which reduction of a power consumption is given priority over suppression of a delay may perform the processing in FIG. 6 when a data signal is to be transmitted.

Next, an example of the above-described predetermined processing performed between the terminal device 103 and the base station device to which a signal is to be transmitted (the second base station device 102) when the terminal device 103 determines that the base station device to which a signal is to be transmitted is different from the last connected base station.

FIG. 7 is a diagram showing an example of the flow of such processing. Upon determining that the base station device to which a signal is to be transmitted is different from the last connected base station, the terminal device 103 transmits an RRCConnectionResumeRequest message that includes "I-RNTI" to perform communication with the base station device to which a signal is to be transmitted, which is the second base station device 102. Upon receiving the message, the second base station device 102 specifies the last connected base station (the first base station device 101) based on I-RNTI, and requests that UE context data be provided. Upon acquiring the UE context data, the second base station device 102 transmits an RRCConnectionResume message to the terminal device 103 to make the terminal device 103 transition to the RRC_CONNECTED state. If an MA signature has been set to the terminal device 103, the first base station device 101 transmits the MA signature to the second base station device 102 to which the terminal device 103 is to be connected. Also, after notifying the second base station device 102 of information regarding the MA signature set to the terminal device 103, the first base station device 101 discards this information. The second base station device 102 determines whether or not to continuously use the received MA signature, notifies the terminal device 103 of an MA signature that has been newly set. Thereafter, the second base station device 102 transmits an RRCRelease message that includes "suspendConfig" to the terminal device 103 to make the terminal device 103 transition to the RRC_INACTIVE state. As a result, the terminal device 103 returns to the RRC_INACTIVE state.

Note that, in one example, the notification regarding the MA signature may include one-bit (or few-bit) information indicating whether or not the MA signature set by the first base station device 101 is to be used without change. For example, if the MA signature set by the first base station device 101 is to be used without change, only such one-bit (or few-bit) information is transmitted to the terminal device 103, and the terminal device 103 keeps holding the MA signature held thereby. As a result, information regarding the MA signature itself is not transmitted, and it is possible to reduce the amount of signaling. If an MA signature that is different from the MA signature set by the first base station device 101 is to be set, information regarding a newly set MA signature may also be transmitted in addition to the one-bit (or few-bit) information.

In the example shown in FIG. 7, the first base station device 101 notifies the second base station device 102 of information regarding the MA signature after the terminal device 103 enters the RRC_CONNECTED state. However, the present invention is not limited to this example. For example, the second base station device 102 may acquire an MA signature from the first base station device 101 before transmitting an RRCConnectionResume message. In this case, the second base station device 102 may determine whether or not to make the terminal device 103 transition to the RRC_CONNECTED state, based on the acquired MA signature. For example, if the second base station device 102 determines that the MA signature set by the first base station device 101 is to be used without change, the second base station device 102 may transmit an RRCConnectionResume message that includes "reject", which indicates that transition to the RRC_CONNECTED state is rejected. In this case, the terminal device 103 may recognize that the MA signature held thereby is to be continuously used, by receiving the RRCConnectionResume message including "reject". Note that, in the RRCConnectionResume message, a one-bit (or a few-bit) information element that is different from the information element indicating "reject" may be used to notify the terminal device 103 that the MA signature set by the first base station device 101 is to be used without change. In such cases, the terminal device 103 can recognize that the MA signature held thereby can be continuously used without transitioning to the RRC_CONNECTED state. When setting a new MA signature instead of using the MA signature of which the second base station device 102 has been notified by the first base station device 101, the second base station device 102 may transmit an RRCConnectionResume message to make the terminal device 103 transition to the RRC_CONNECTED state. Note that the MA signature may be set without making the terminal device 103 transition to the RRC_CONNECTED state, using a message or procedures that the terminal device 103 in the RRC_INACTIVE state can receive, other than the RRCConnectionResume message.

FIG. 8 shows another example of the flow of the above-described predetermined processing. FIG. 7 shows an example in which the second base station device 102 sets an MA signature to the terminal device 103 without a request from the terminal device 103, where FIG. 8 shows an example in which the terminal device 103 requests for an MA signature. In FIG. 8, the terminal device 103 transmits a message that includes information indicating a request for an MA signature, to the second base station device 102 that is the base station device to which a signal is to be transmitted. Although the message used here as an example is an RRCConnectionResumeRequest, any message that can specify that the terminal device 103 requests that the base station device to which a signal is to be transmitted sets an MA signature may be used. Upon receiving this message, the second base station device 102 transmits a request for acquiring UE context data, to the first base station device 101. At this time, the second base station device 102 may include information indicating a request for an MA signature, in the message that is requesting to acquire UE context data. Note that the information indicating a request for an MA signature may be transmitted separate from the request for acquiring UE context data.

Upon receiving information indicating a request for an MA signature, the first base station device 101 notifies the second base station device 102 of information regarding the MA signature set to the terminal device 103. Thereafter, the second base station device 102 determines whether or not to use the acquired MA signature without change, and sets an MA signature to the terminal device 103 according to the result of the determination. This setting may be performed by using, for example, an RRCConnectionResume message, after the terminal device 103 has transitioned to the RRC_CONNECTED state, or, as described above, for example, by notifying that the MA signature held by the terminal device 103 is to be continuously used, using an RRCConnectionResume message including "reject", while the terminal device 103 stays in the RRC_INACTIVE state. Alternatively, the second base station device 102 may transmit an RRCRelease message that includes "suspendConfig", instead of transmitting an RRCConnectionResume message, to notify that the MA signature held by the terminal device 103 is to be continuously used. Alternatively, the second base station device 102 may set a new MA signature that is different from the MA signature held by the terminal device 103 by using a message or procedures that can be used to transmit a certain amount of data signal to the terminal device 103 in the RRC_INACTIVE state. In such cases, the terminal device 103 can set the MA signature that can be used in communication with the second base station device 102 while staying the RRC_INACTIVE state without transitioning to the RRC_CONNECTED state.

As described above, the terminal device 103 according to the present embodiment determines whether or not the base station device to which a signal is to be transmitted has changed from the last connected base station while holding the MA signature and operating in the RRC_INACTIVE state, and if the base station device has not changed, the terminal device 103 can transmit a certain amount (a small amount) of data to the last connected base station by using the MA signature held thereby. On the other hand, if the base station device to which a signal is to be transmitted has changed from the last connected base station while the terminal device 103 is holding the MA signature and is operating in the RRC_INACTIVE state, the terminal device 103 acquires a new MA signature so that the terminal device 103 can perform communication in the RRC_INACTIVE state, or transitions to the RRC_CONNECTED state, to transmit a data signal to the base station device to which a signal is to be transmitted. As a result, the terminal device 103 can appropriately recognize whether or not the MA signature is available, and transmit a data signal to a base station device (a network) without unnecessarily transitioning to the RRC_CONNECTED state.

With the present invention, it is possible to enable a terminal device to perform efficient communication in a stand-by state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal device comprising:
   one or more processors; and
   one or more memories that store computer-readable instruction for causing, when executed by the one or more processors, the terminal device to:
   operate in one of a plurality of states that include a first state in which a connection with a first base station device has been established, and a second state in which a connection with the first base station device has not been established, but the first base station device holds information regarding the terminal device;
   after the terminal device that has been operating with the first base station device in the first state starts operating in the second state,
   determine whether or not predetermined information that enables the terminal device to perform communication with the first base station device in the second state and that has been acquired from the first base station device in the first state is held;
   determine whether or not a target to which a signal is to be transmitted has changed from the first base station device to a second base station device;
   in a case where it is determined that the predetermined information is held and the target to which the signal is to be transmitted has not changed, when communicating with the first base station device, to
   perform communication using the predetermined information without transitioning from the second state; and
   in a case where it is determined that the predetermined information is held and the target to which the signal is to be transmitted has changed, when communicating with the second base station device, to perform communication with transitioning to the first state and without using the predetermined information.

2. The terminal device according to claim 1,
   wherein the terminal device does not determine whether or not the target to which the signal is to be transmitted has changed from the first base station device to the second base station device, if it is determined that the predetermined information is not held.

3. The terminal device according to claim 1, wherein in a case where it is determined that the predetermined information is held and the target to which the signal is to be transmitted has changed, the terminal device transitions to the first state by establishing connection with the second base station device and to transmit the signal to the second base station device.

4. The terminal device according to claim 1,
   wherein, upon the target to which the signal is to be transmitted changing to the second base station device while the terminal device is in the second state, the predetermined information is discarded.

5. The terminal device according to claim 1, wherein, when the signal is to be transmitted while the terminal device is operating in the second state, the terminal device determines whether or not the predetermined information is held.

6. The terminal device according to claim 1,
   wherein, when the terminal device is in the first state and the signal is transmitted to the target to which the signal is to be transmitted, the terminal device acquires the predetermined information from the target to which the signal is transmitted.

7. The terminal device according to claim 1,
   wherein, upon the target to which the signal is to be transmitted changing to the second base station device while the terminal device is in the second state, the terminal device acquires the predetermined information from the second base station device.

8. The terminal device according to claim 7,
   wherein the terminal device acquires the predetermined information by communicating with the second base station device without transitioning from the second state to another state.

9. The terminal device according to claim 1,
   wherein, when the signal is to be transmitted, if the terminal device is not operating in the second state, the terminal device transmits the signal to the target to which the signal is to be transmitted, in the first state.

10. The terminal device according to claim 1,
    wherein, when the signal is to be transmitted while the terminal device is operating in the second state, if the target to which the signal is to be transmitted is the second base station device, the predetermined information is discarded.

11. A control method for controlling a terminal device, the control method comprising:
    operating in one of a plurality of states that include a first state in which a connection with a first base station device has been established, and a second state in which a connection with the first base station device has not been established, but the first base station device holds information regarding the terminal device, and after the terminal device that has been operating with the first base station device in the first state starts operating in the second state, determining whether or not predetermined information that enables the terminal device to perform communication with the first base station device in the second state and that has been acquired from the first base station device in the first state is held;

determining whether or not a target to which a signal is to be transmitted has changed from the first base station device to a second base station device;

in a case where it is determined that the predetermined information is held and the target to which the signal is to be transmitted has not changed, when communicating with the first base station device, to perform communication using the predetermined information without transitioning from the second state; and in a case where it is determined that the predetermined information is held and the target to which the signal is to be transmitted has changed, when communicating with the second base station device, to perform communication with transitioning to the first state and without using the predetermined information.

12. A non-transitory computer-readable storage medium that stores a program that causes a computer included in to, after a terminal device that has been operating with a first base station device in a first state of a plurality of states starts operating in a second state, wherein the first state is a state in which a connection with a first base station device has been established, and the second state is a state in which a connection with the first base station device has not been established but the first base station device holds information regarding the terminal device, determine whether or not predetermined information that enables the terminal device to perform communication with the first base station device in the second state and that has been acquired from the first base station device in the first state is held;

determine whether or not a target to which a signal is to be transmitted has changed from the first base station device to a second base station device;

in a case where it is determined that the predetermined information is held and the target to which the signal is to be transmitted has not changed, when communicating with the first base station device, to perform communication using the predetermined information without transitioning from the second state; and in a case where it is determined that the predetermined information is held and the target to which the signal is to be transmitted has changed, when communicating with the second base station device, to perform communication with transitioning to the first state and without using the predetermined information.

* * * * *